(12) United States Patent
Bruggemann

(10) Patent No.: US 11,446,675 B2
(45) Date of Patent: Sep. 20, 2022

(54) CONTINUOUS FEED MULTI-PURPOSE PLANT/FLOWER TRIMMER AND SEPARATOR

(71) Applicant: Thomas Bruggemann, Woodland Hills, CA (US)

(72) Inventor: Thomas Bruggemann, Woodland Hills, CA (US)

( * ) Notice: Subject to any disclaimer, the term of this patent is extended or adjusted under 35 U.S.C. 154(b) by 304 days.

(21) Appl. No.: 16/395,150

(22) Filed: Apr. 25, 2019

(65) Prior Publication Data

US 2020/0338566 A1 Oct. 29, 2020

(51) Int. Cl.
*B02C 17/18* (2006.01)

(52) U.S. Cl.
CPC ............................. *B02C 17/1855* (2013.01)

(58) Field of Classification Search
CPC .. A01G 3/002; A01G 2003/005; A23N 15/02; B02C 17/1835; B02C 17/1855; B07B 1/24
USPC ..... 209/293, 294, 298; 241/74, 91; 366/225, 366/226, 228, 229, 231, 234
See application file for complete search history.

(56) References Cited

U.S. PATENT DOCUMENTS

| | | | | |
|---|---|---|---|---|
| 1,256,492 A | * | 2/1918 | Urschel | A23N 15/12 99/636 |
| 2,265,642 A | * | 12/1941 | Hamachek, Jr. | B07B 1/185 209/411 |
| 2,979,096 A | * | 4/1961 | Karge | A23N 15/12 366/225 |
| 7,625,749 B2 | * | 12/2009 | Sundberg | C05F 17/929 435/290.3 |
| 8,127,668 B2 | * | 3/2012 | Snyder, Jr | A23N 15/025 99/636 |
| 2007/0004480 A1 | * | 1/2007 | Taylor | A23N 15/10 460/142 |
| 2017/0197217 A1 | * | 7/2017 | Bruggemann | B02C 19/0012 |
| 2019/0297782 A1 | * | 10/2019 | Mosman | A01G 3/002 |

FOREIGN PATENT DOCUMENTS

GB 1201421 A * 8/1970 ............. A23N 15/12

* cited by examiner

*Primary Examiner* — Shelley M Self
*Assistant Examiner* — Jared O Brown
(74) *Attorney, Agent, or Firm* — Carson Patents; Gregory D Carson

(57) ABSTRACT

A continuous feed machine for trimming and separating plant material, the machine having one or more augers or conveyors for feeding plant material into a trommel barrel covered with mesh netting, adapted to include baffles between longitudinal sections of the trommel barrel, and sized for rotational speeds to so as to process the plant material as components of the plant material progress longitudinally through successive sections of the trommel barrel. The mesh netting trims plant material as it moves through the trommel barrel, with the trim falling through the mesh netting. One or more augers or conveyors may be used to remove trimmed plant material exiting an output end of the trommel barrel, and one or more augers or conveyors may be used to remove trim material from below one or more sections of the trommel barrel.

20 Claims, 11 Drawing Sheets

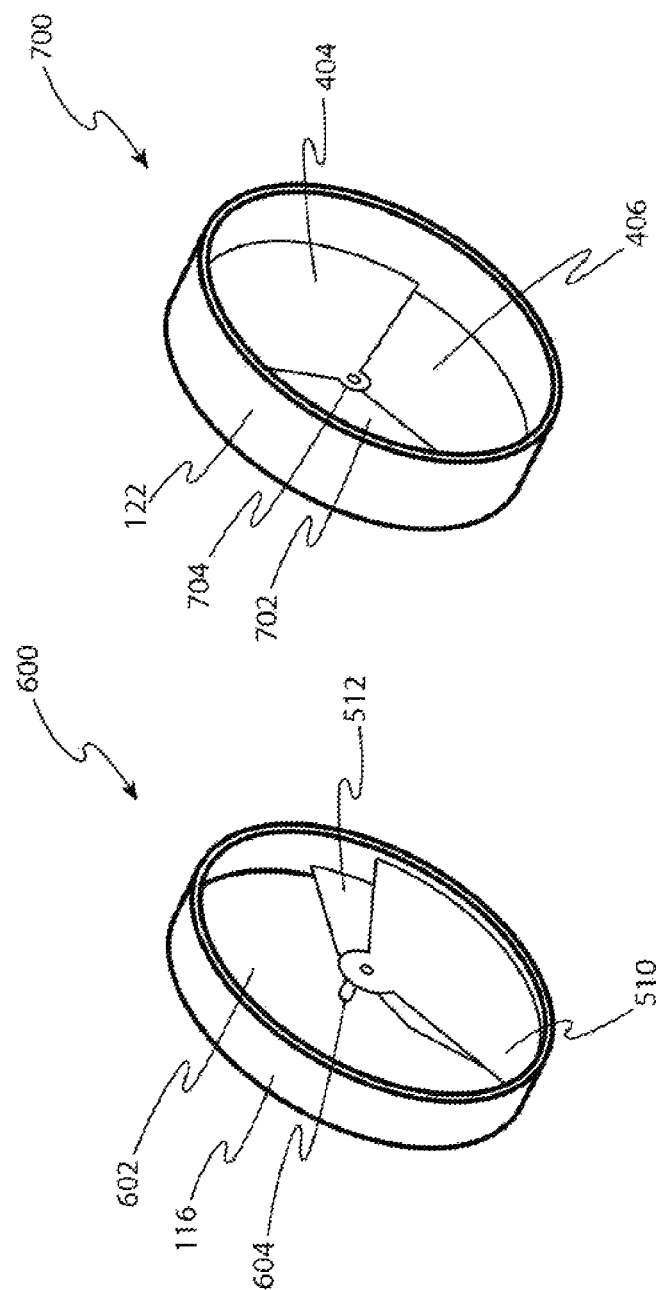

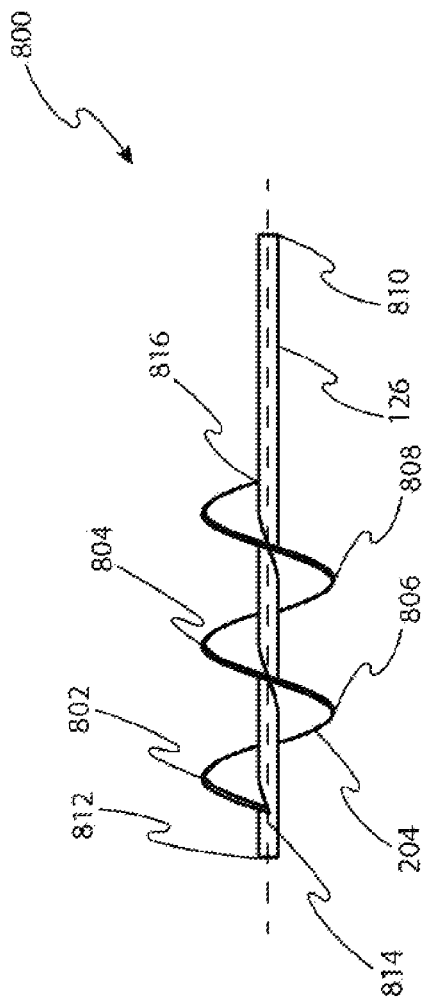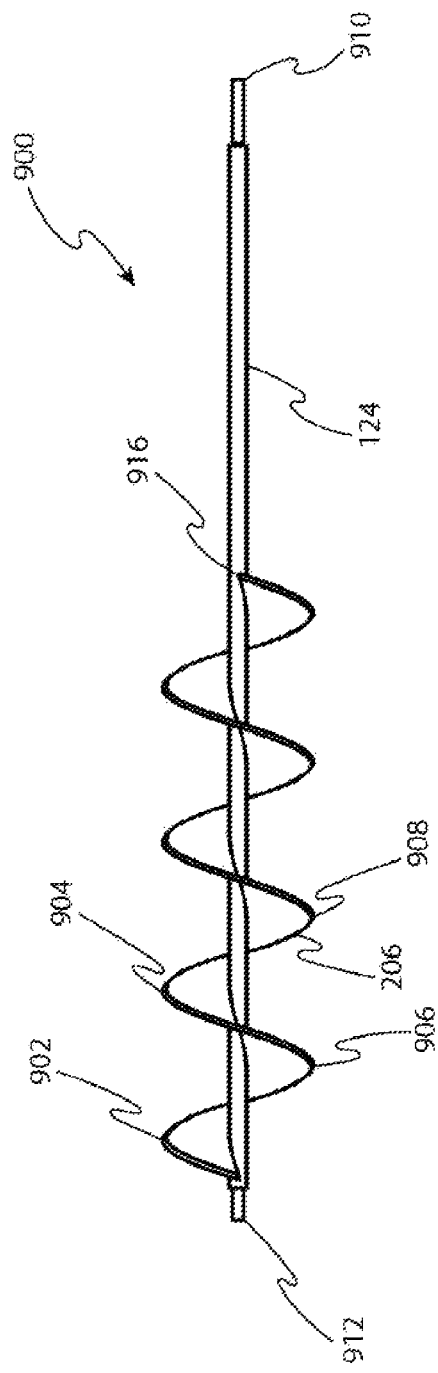

CONTINUOUS FEED MULTI-PURPOSE PLANT/FLOWER TRIMMER AND SEPARATOR

CROSS-REFERENCE TO RELATED APPLICATIONS

None.

BACKGROUND OF THE INVENTION

The technical field of the invention pertains generally to agricultural equipment for trimming and separating plant material, and, more particularly, to designs and methods of continuous feed equipment for trimming and separating various plant material.

Generally, it is desirable to remove stems and leaves from harvested plant material such as hops, parsley, rosemary, coriander, lavender, mixed flowers, basil, and a wide variety of other plant materials which may be used in the production of essential oils and other plant-based products. Removing stems and leaves by hand is labor intensive, so automated or semi-automated trimmer and separator machines can be used to reduce the amount of human labor and processing time required. For example, U.S. Pat. No. 8,757,524 (Mosman) describes an apparatus whose typical application would be to process plant material so that the remaining trimmed plant material comprises only buds and flowers for use in potpourri, fragrant sashes, or as a pre-processing step in the production of essential oils. The apparatus described in Mosman and other available machines, however, have disadvantages.

Conventional trimmer machines are expensive due to the complexity of their designs. For example, the Mosman apparatus comprises a kitchen-counter-top-height roller cart structure with a combination of a slotted metal cylinder, a cutting reel, a roller cleaning brush, a vacuum manifold for collecting waste debris, a cleaning liquid sprayer system, separate motors with pulleys and gears for separately rotating the cutting reel and slotted cylinder, and various adjustments and controls. Another example, described in U.S. Pat. No. 9,636,838 (Evans et al.), comprises a similarly sized and proportioned cart or frame as in Mosman, a hopper fed slotted metal cylinder, a trim collection vacuum manifold, and a cutting system that uses a helical cutting reel and a fixed blade bar.

Bladed trimmers typically use a cutting reel with a number of helical blades, each with a cutting surface that engages with (as in Evans et al.) a fixed blade bar or (as in Mosman) the exterior of the rotating metal cylinder with slotted holes that holds the plant material being processed. In such machines, plant material is tumbled within a rotatable cylinder that is perforated with slotted holes. As portions of the plant material protrude through the slotted holes, the protruding portions are trimmed off by the cutting reel blades. Both the tumbling action within the metallic cylinder and cutting the plant material using metallic blades can be overly aggressive, potentially causing unwanted damage to the processed plant material.

As with any metal-to-metal cutting system, regular maintenance is required, such as routine lubrication and sharpening, although some manufacturers of these machines advertise the blades as self-sharpening. Regardless, lubricant residue (applied during routine maintenance and released during machine operation) and fine metallic dust (from the metal-to-metal cutting operation of the machine) may contaminate the trimmed plant material as well as the removed trim material.

Another disadvantage of conventional machines is that they typically operate in a batch fashion, requiring repeated unloading and reloading. For example, with a typical bladed trimmer comprising a metal cylinder with slotted holes and a corresponding rotating blade, plant material is loaded into the rotatable cylinder. As the cylinder rotates, the plant material inside tumbles and portions of the plant material engage with the edges of the slotted holes and protrude through the holes. The rotating blade shears the protruding plant material leaving the trimmed plant material within the cylinder. Once enough of the desired trim is removed, the resultant trimmed plant material is then unloaded and another batch of untrimmed plant material may then be loaded into the cylinder.

What is needed, therefore, are new designs and methods for trimmer and separator machines that address shortcomings of the available designs and methods.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

For a more complete understanding of the present invention, the drawings herein illustrate examples of the invention. The drawings, however, do not limit the scope of the invention. Similar references in the drawings indicate similar elements.

FIG. 6 is a perspective view of a hoop portion of the barrel assembly shown in FIG. 5, along with an associated bearing section (or bearing divider) and bearing spinner (together comprising a baffle), according to preferred embodiments.

FIG. 7 is a perspective view of a hoop portion of the barrel assembly shown in FIG. 5, along with an associated divider section and spinning divider (together comprising a baffle), according to preferred embodiments.

FIG. 8 is a side or top view of an input hopper upper auger, according to preferred embodiments.

FIG. 9 is a side or top view of an input hopper lower auger, according to preferred embodiments.

DESCRIPTION OF PREFERRED EMBODIMENTS

Figure 1:
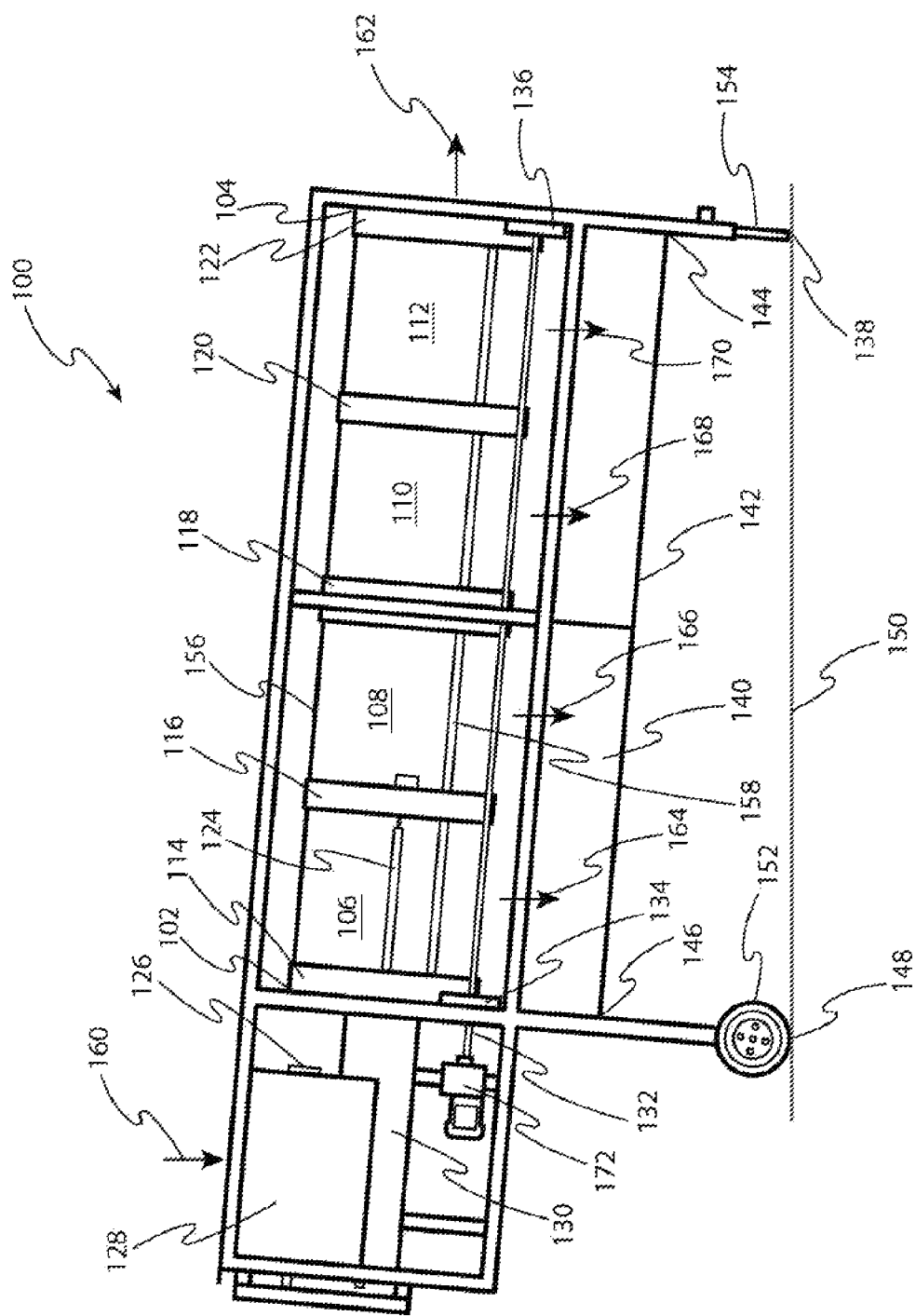
FIG. 1 is a side view of a continuous feed multi-purpose plant/flower trimmer and separator machine, shown in an inclined orientation, according to preferred embodiments.

In the following detailed description, numerous specific details are set forth in order to provide a thorough understanding of the preferred embodiments. However, those skilled in the art will understand that the present invention may be practiced without these specific details, that the present invention is not limited to the depicted embodiments, and that the present invention may be practiced in a variety of alternate embodiments. In other instances, well known methods, procedures, components, and systems have not been described in detail.

Although preferred embodiments are presented and described in the context of continuous feed multi-purpose equipment and methods for dry trimming or wet trimming plant flowers of leafy matter, for separating and isolating various sized particles from plant matter, for separating seeds from plant matter, and for breaking down large leaf and plant matter into smaller plant material components, numerous separable inventive aspects are presented that may be used in a variety of other applications and with the use of a variety of other types equipment associated with various applications. For example, the structures and methods discovered and disclosed herein comprising using one or more screw type augers to feed plant material (optionally, from a hopper) into a trommel screen (or barrel assembly) adapted with adjustable baffles (or dampers) to sectionalize the barrel assembly, control material flow rate through each section into a successive section, allow for accumulation of enough plant material in each section of the barrel assembly to achieve a desirable movement of material (such as a curling wave of tumbling plant material) within the particular section, allow for plant material within each section to rub against other plant material and grate against the nylon mesh netting for adequate trimming and separation of plant material components, and to control the rate of trimmed plant material emerging from the output end of the barrel assembly, may also be used more generally to trim, separate, and/or sort fibrous or mixed sized material components, or other materials.

The present inventor discovered new, unique, and truly innovative methods, systems, and apparatus for trimming and separating plant materials. Various embodiments are illustrated and described in the figures, sketches, details, descriptive materials, and pictures submitted herewith. The various embodiments include separable inventive aspects which are separately patentable. The listed inventive aspects are not exhaustive or comprehensive, and further/additional separable inventive aspects are included in the submitted materials but may not be specifically or particularly identified or described in words due to the need to capture (in many instances in detailed illustrations, pictures, or sketches) the many separable inventive aspects in this disclosure.

The present inventor developed floor-standing equipment and methods for trimming and separating dried leafy matter off and from the buds/flowers of plants by tumbling the plant material within a cylindrical drum that is operated in a batch fashion, described in U.S. Pub. No. US 2017/0197217 (Bruggemann), Published Jul. 13, 2017. Operation comprises loading plant material into a mesh nylon netting enclosed drum, rotating the drum using a motor or a hand crank for approximately 1-5 minutes at approximately 35 rotations per minute (RPM), unloading or removing the trimmed plant material remaining within the drum, and repeating the loading and unloading steps to process (trim and separate) additional plant material. U.S. Pub. No. US 2017/0197217 A1 (Bruggemann), and Published Jul. 13, 2017, corresponding to patent application Ser. No. 15/469,525 filed on Mar. 25, 2017, is hereby incorporated in its entirety by reference.

Figure 10:
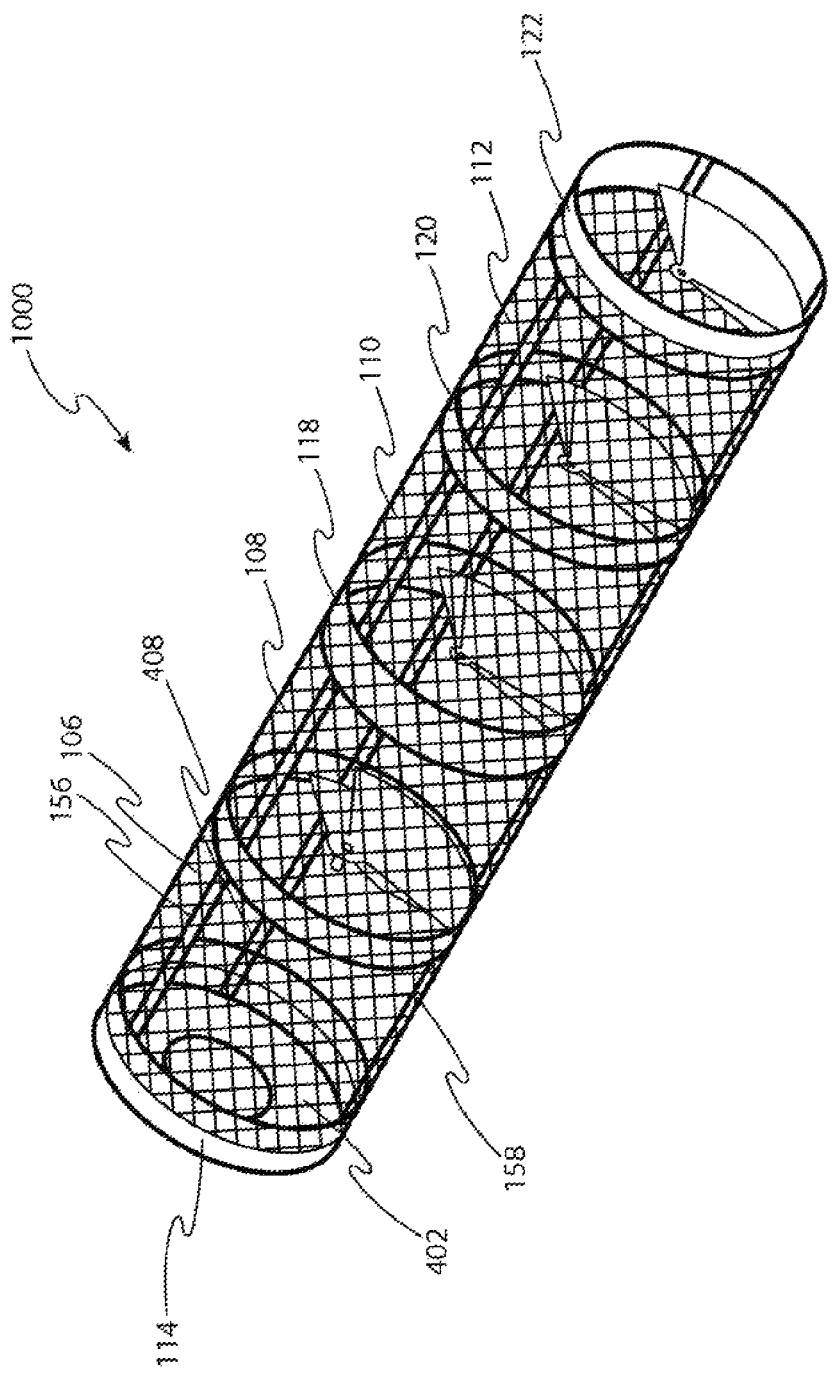
FIG. 10 is a perspective view of the barrel assembly shown in FIG. 5 illustrated with cross-hatching to depict portions of the barrel assembly covered or enveloped with a screening material having holes therethrough, according to preferred embodiments.
Figure 11:
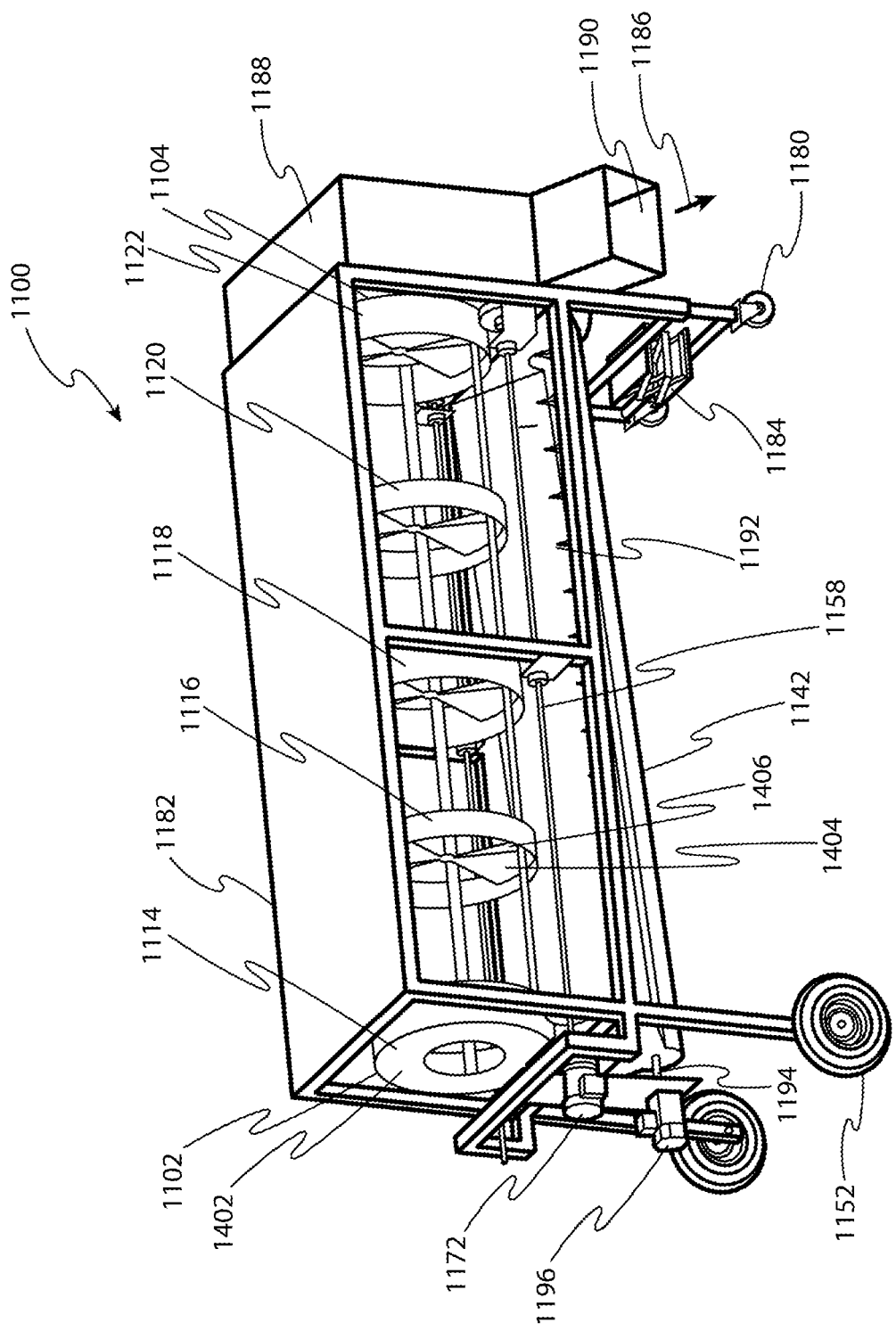
FIG. 11 is a perspective view of a trommel barrel portion of a continuous feed multi-purpose plant/flower trimmer and separator machine, according to preferred embodiments.
Figure 12:
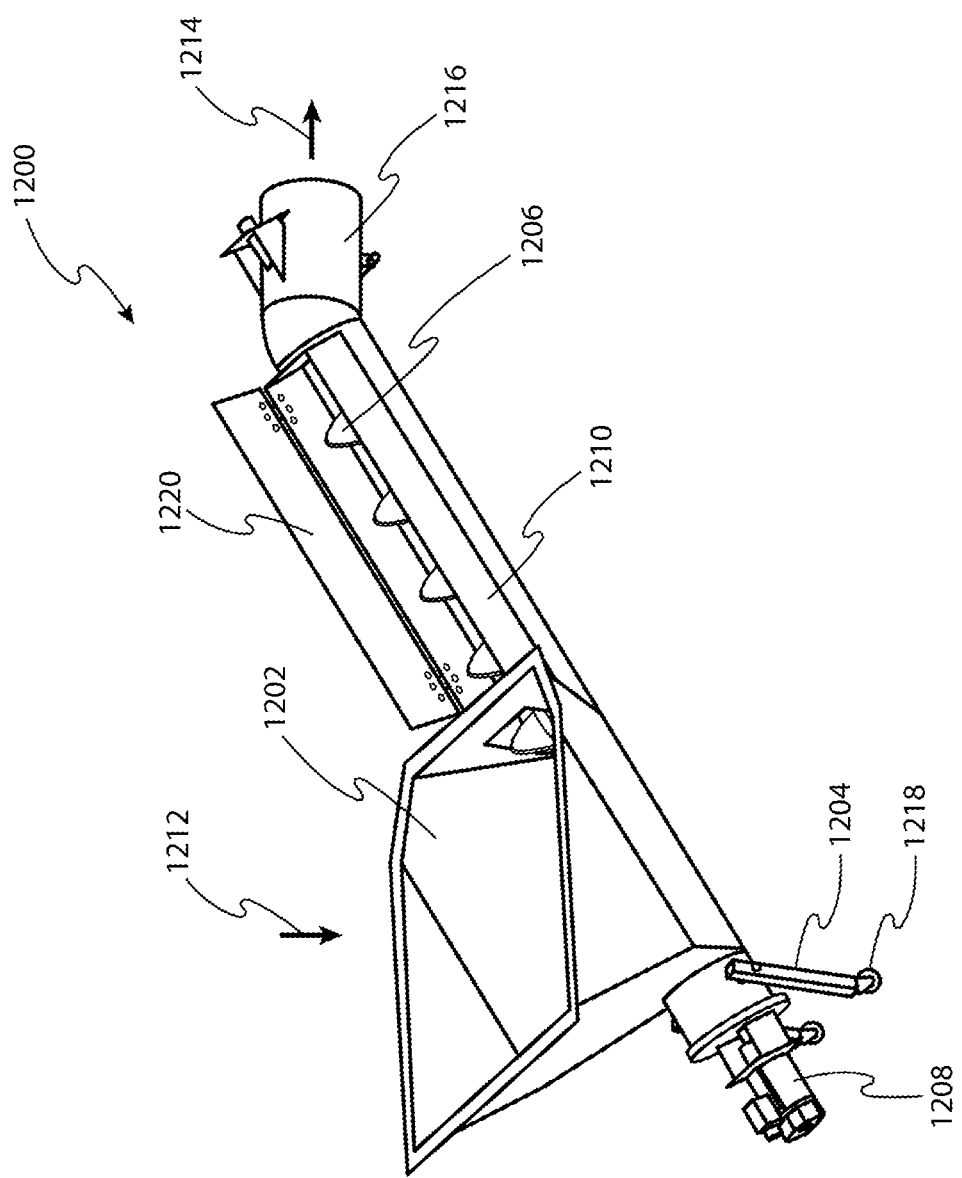
FIG. 12 is a perspective view of an input hopper and auger portion of a continuous feed multi-purpose plant/flower trimmer and separator machine, according to preferred embodiments.
Figure 13:
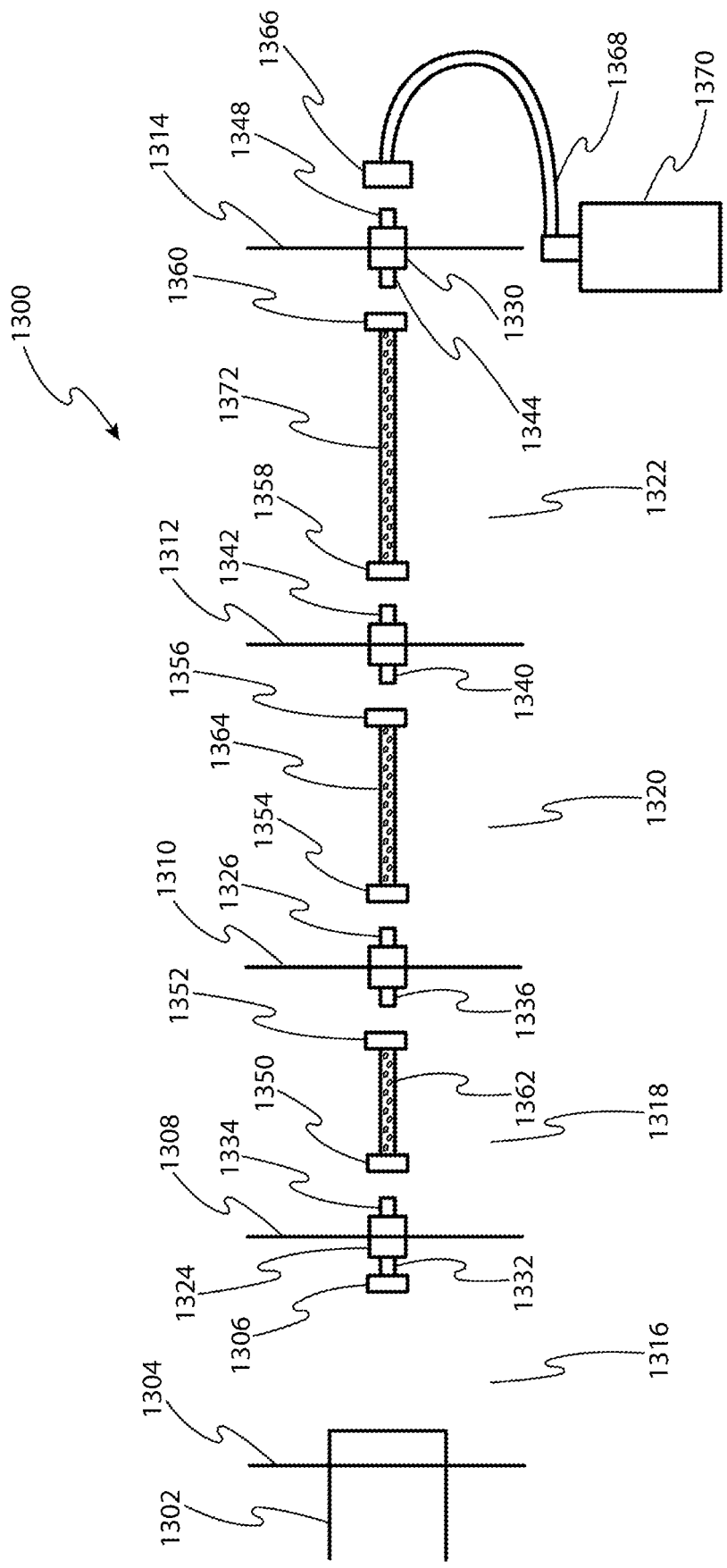
FIG. 13 is a conceptual partially exploded side view of a barrel (or trommel) assembly incorporating a carbon dioxide (CO2) infusion system, according to preferred embodiments.

The present inventor developed continuous feed trimmer and separator equipment and methods therefor, that address the shortcoming of the available designs and methods. Preferred embodiments comprise what may be referred to as "bladeless" trimming and separating equipment and methods. Preferred embodiments are free from a cutting reel, a roller cleaning brush, a cleaning liquid sprayer system, separate motors with pulleys and gears for separately rotating the cutting reel, a fixed blade bar, and various adjustments and controls that may be associated therewith, in contrast with available apparatus and those described in Mosman and in Evans et al. FIGS. 1-4 illustrate a continuous feed multi-purpose plant/flower trimmer and separator machine 100 in various orthogonal views and orientations, according to preferred embodiments. FIGS. 5-7 illustrate perspective views of a trommel barrel assembly 500 and exemplary adjustable baffles or dampers incorporated therein, according to preferred embodiments. FIGS. 8-9 illustrate exemplary feed augers 800 and 900 associated with receiving 160 plant material into an input hopper 128. FIG. 10 depicts mesh nylon netting covering the trommel barrel assembly, according to preferred embodiments. FIGS. 11-12 illustrate a continuous feed multi-purpose plant/flower trimmer, separator, and/or sorter machine with an auger feed system, according to preferred embodiments. Finally, FIG. 13 depicts an exemplary carbon dioxide (CO2) infusion system incorporated into a trommel barrel assembly.

Generally, as an overview, the machine 100, as shown and according to preferred embodiments, receives 160 plant material to be trimmed and separated into hopper 128, and moves the plant material through the bottom of the hopper and lower auger housing 130 to introduce the plant material into a cylindrical trommel barrel assembly extending from a near end 102 to a far end 104. Drive wheels 134 and 136 engage cylindrically shaped hoops (or barrel members) 114 and 122 to rotate the trommel barrel assembly. Adjustable baffles or dampers are incorporated in each of the barrel hoop members 116, 118, 120, and 122, as shown in FIG. 5, for controlling the material flow characteristics such as amount of material allowed to accumulate within each section of the barrel before passing to the next section, the rate of material flow from each section to the next, the rate of trimmed plant material flowing from the trommel barrel output 162, and material tumbling characteristics. A nylon mesh netting covers the barrel assembly, as illustrated in FIG. 10. The barrel is rotated at a speed and with enough plant material within a given barrel section to trim and separate, for example, dried leafy matter off and from the buds/flowers of plants by tumbling the plant material within the mesh barrel, in a continuous curling wave that gently rubs the flowers/buds (plant material/plant components) together (against each other) and that grates them along the nylon netting. The trim falls through the netting in each of the spaces 106, 108, 110, and 112 and into respective areas 164, 166, 168, and 170 of a trough 140 under the trommel barrel assembly.

Turning now to describe the drawings in greater detail, FIG. 1 is a side view of a continuous feed multi-purpose plant/flower trimmer and separator machine 100, shown in an inclined orientation, according to preferred embodiments. An open top input 160 allows for material (such as plant material) to be fed into a hopper 128 which preferably comprises an upper portion (pointed to by reference numeral 128) and a lower portion 130. An upper auger axle 126 rotates a screw type upper hopper auger to loosen and facilitate movement of the input material downward into the lower portion 130 where within a lower auger is positioned, rotated by lower auger axle 124 to move the material from the hopper into a near end 102 of a trommel barrel assembly that extends longitudinally from the near end 102 to a far end 104.

In some embodiments, the upper auger is omitted. In other embodiments, the input 160 may instead comprise a conveyor (not shown) or input auger (not shown) oriented to feed material directly into the lower portion 130. In still other embodiments, material may be fed into the near end 102 of the trommel barrel using a conveyor (not shown).

The trommel barrel assembly preferably comprises a cylindrical assembly of hoops 114, 116, 118, 120, and 122 fastened to one another by three longitudinal hoop connecting members 156, 158, and 408 and spaced apart as shown in FIG. 1 to create (preferably four equally sized) sections 106, 108, 110, and 112 between the (preferably five) hoops. More or less sections may be formed, and the sections may be sized differently with respect to each other. Preferably, the trommel barrel assembly comprises four sections as shown, and mesh nylon netting (as depicted in FIG. 10) covers the sections/spaces 106 (first section), 108 (second section), 110 (third section), and 112 (fourth section) between the barrel hoops 114 (first hoop), 116 (second hoop), 118 (third hoop), 120 (fourth hoop), and 122 (fifth hoop).

As shown in FIG. 1, the lower auger axle 124 extends longitudinally from the near end 102 of the trommel barrel to a bearing in the second hoop 116 assembly. A motor 172 preferably rotates a drive axle 132 that extends longitudinally along the trommel barrel to drive a near end drive wheel 134 and a far end drive wheel 136, with each drive wheel engaging a respective barrel hoop surface to rotate the trommel barrel assembly. Separate motors (not shown) may be used to drive the upper auger axle 126 and lower auger axle 124. Or both upper and lower auger axles may be driven by the same motor, with drive belts or chains linking the two. Or the motor 172 may be used to drive the main trommel drive axle 132 with rotational power take off linkages to drive both the upper auger axle 126 and lower auger axle 124.

A trough 140 preferably extends from a near end 146 to a far end 144 underneath the trommel barrel assembly to receive trim and material separated from material within each section of the trommel barrel. For example, trim that falls through the mesh covered area 106 falls downward into an area 164 below that section 106, and likewise trim falls through mesh area 108 into trough area 166, through mesh area 110 into trough area 168, and through mesh area 112 into trough area 170. Optionally, partitions within the trough 140 may be used to separate the trim collection areas 164, 166, 168, and 170. Further, one or more augers or conveyors (not shown) may be positioned in the trough 140 areas to move trim from each of the areas 164, 166, 168, and 170, according to some embodiments. Similarly, in preferred embodiments, an auger or conveyor (not shown) may be positioned at the far end 104 of the trommel barrel assembly to receive and move output 162 of trimmed material as the trimmed material emerges from the rotating trommel barrel assembly.

The machine 100 is preferably equipped to be portable with wheels 152, 216. In preferred embodiments, the trommel barrel assembly is housed within a frame having adjustable legs 154 at least at one end so that the output 162 end of the trommel barrel assembly may be set at a height lower than its input end. As shown, legs 154 may be lowered so that the longitudinal center axis 304 of the trommel barrel assembly, that is, the center axis of rotation running lengthwise along lower auger axle 124 and extending longitudinally through the far end 104 of the barrel assembly, may be adjusted to provide an incline. As shown in FIG. 1, the distance 144-138 at the far end 104 of the barrel assembly between the bottom trough surface 142 and the horizontal floor/ground surface 150 is less than is the distance 146-148 at the near end 102.

Figure 2:
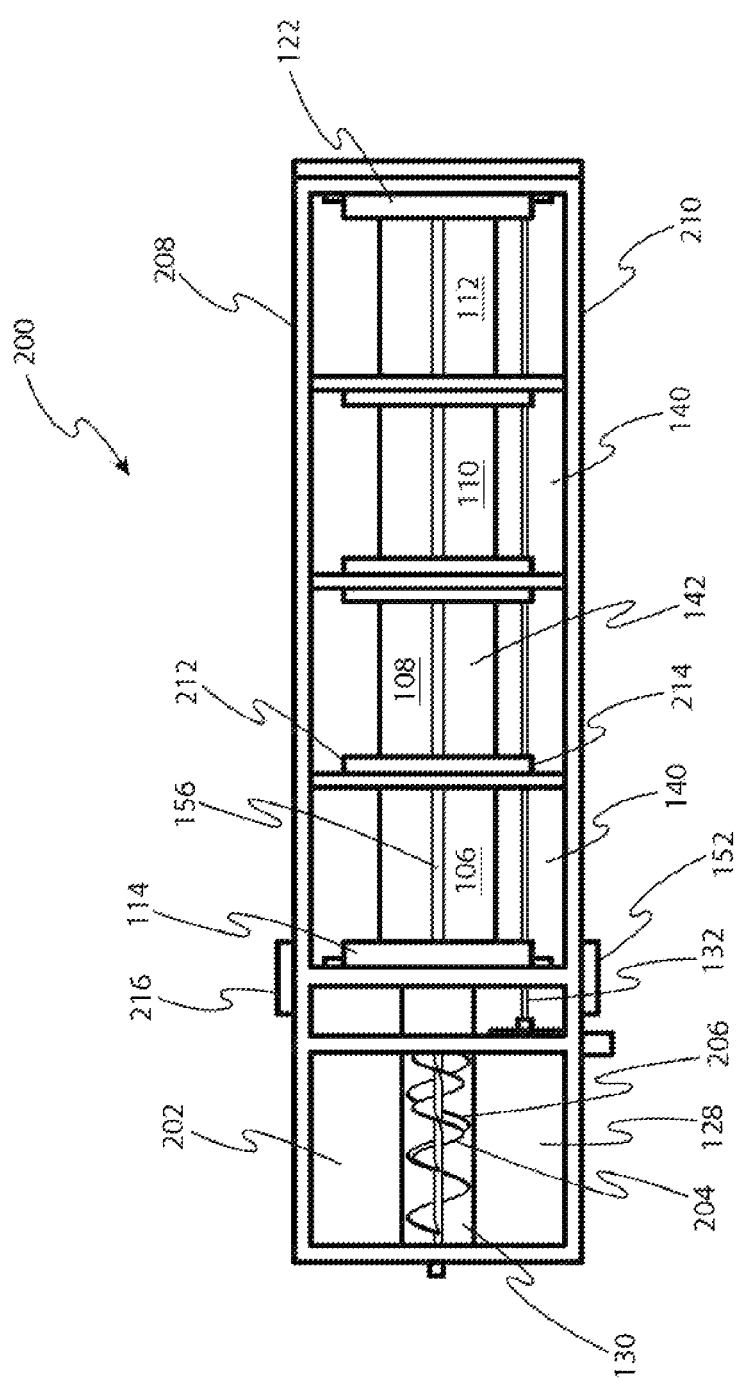
FIG. 2 is a top view of the machine shown in FIG. 1, according to preferred embodiments.

FIG. 2 provides a top view 200 of the machine 100, according to preferred embodiments. Each of the barrel hoops 114, 116, 118, 120, and 122 are shown with a diameter 212-214. The machine 100 preferably comprises a frame housing that fully contains the barrel assembly, with a side-to-side width dimension 208-210. From above, an upper surface 202 of the hopper 128 is visible, as are both an upper auger 204 and a portion of a lower auger 206 not hidden within a portion of the bottom of the hopper/lower auger housing 130 that extends to the near end 102 of the trommel barrel.

Figure 3:
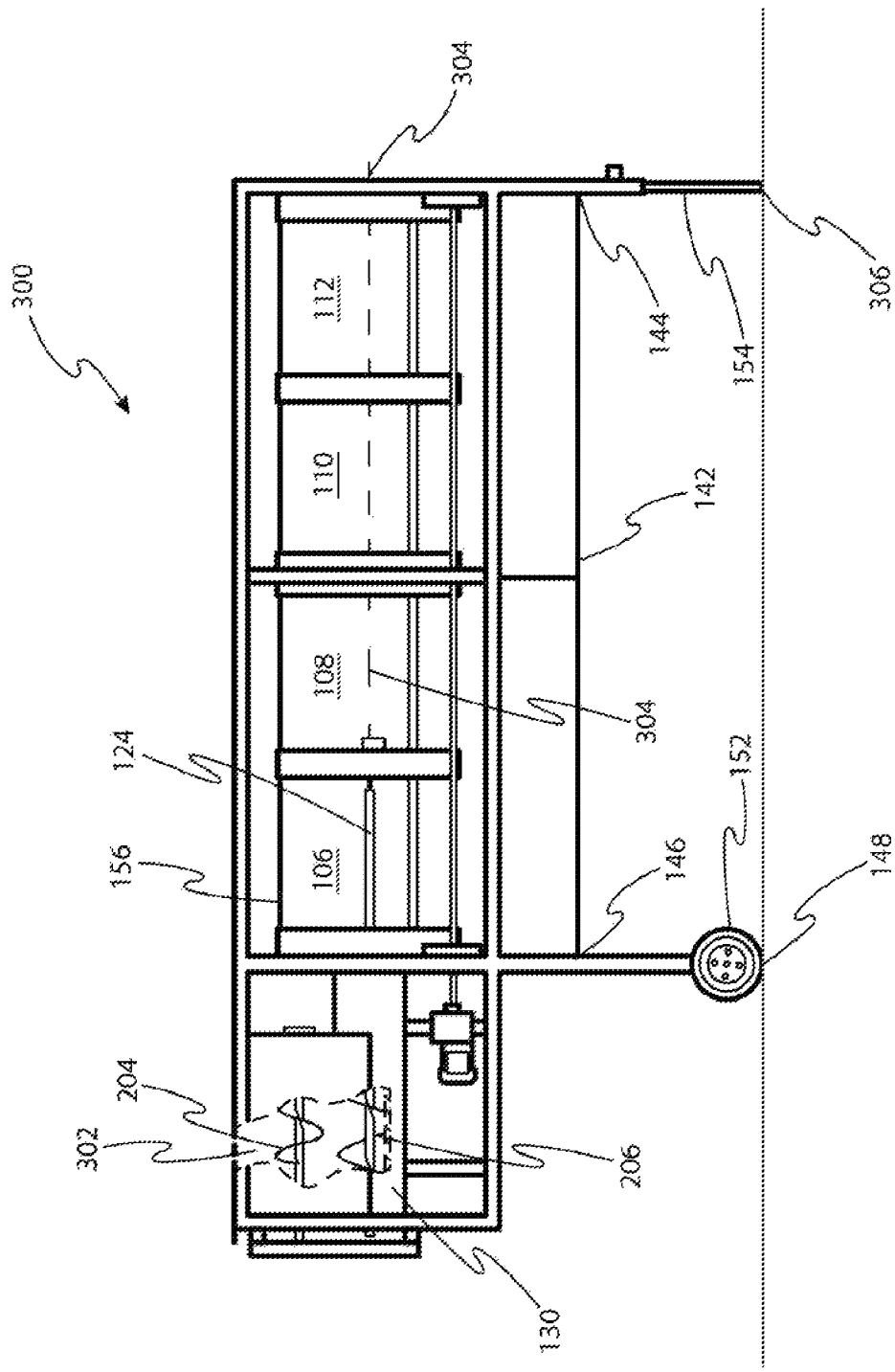
FIG. 3 is a partially cut away side view of the machine shown in FIG. 1, shown in a non-inclined (horizontal) orientation, according to preferred embodiments.

To more clearly view the orientation of the upper and lower augers, FIG. 3 provides a partially cut away side view 300 of the machine 100, with the cut away portion 302 illustrating the relative positions of the upper auger 204 and lower auger 206, according to preferred embodiments. FIG. 3 also illustrates the machine 100 with adjustable legs 154 extended so that heights 144-306 and 146-148 are the same, providing an orientation of the machine 100 without incline. As shown, the longitudinal center axis 304 of the trommel barrel assembly is horizontal, without any downward slope between the near (or input) end 102 of the barrel assembly and its far (or output) end 104.

Figure 4:
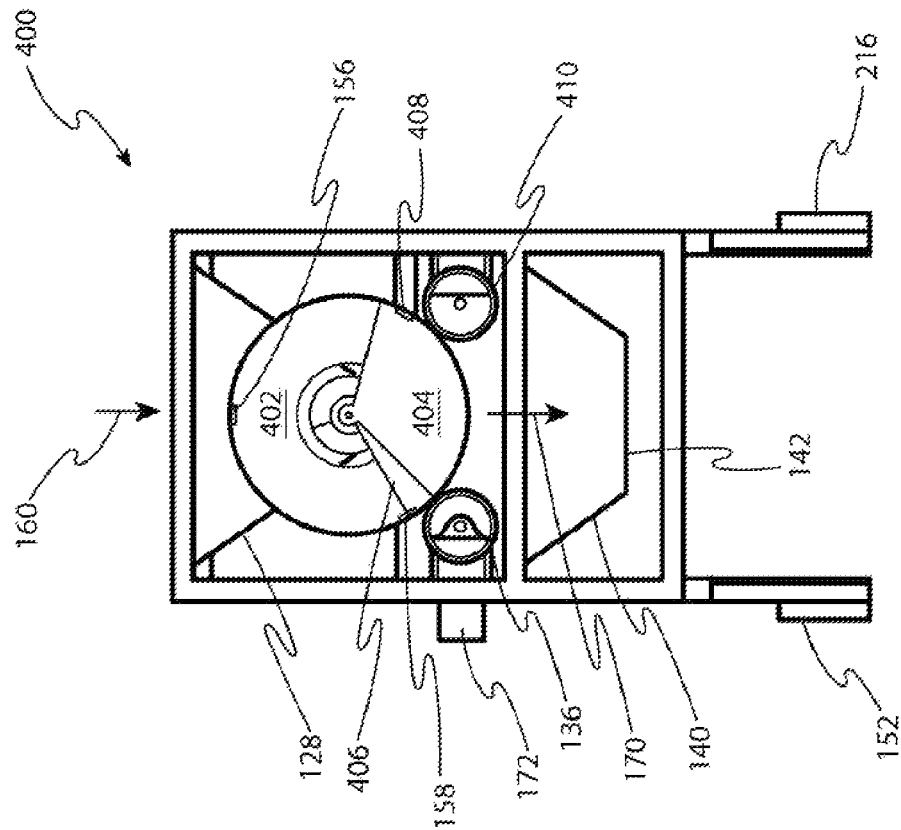
FIG. 4 is an end view of the machine shown in FIG. 3, as viewed from its output or far end, according to preferred embodiments.
Figure 5:
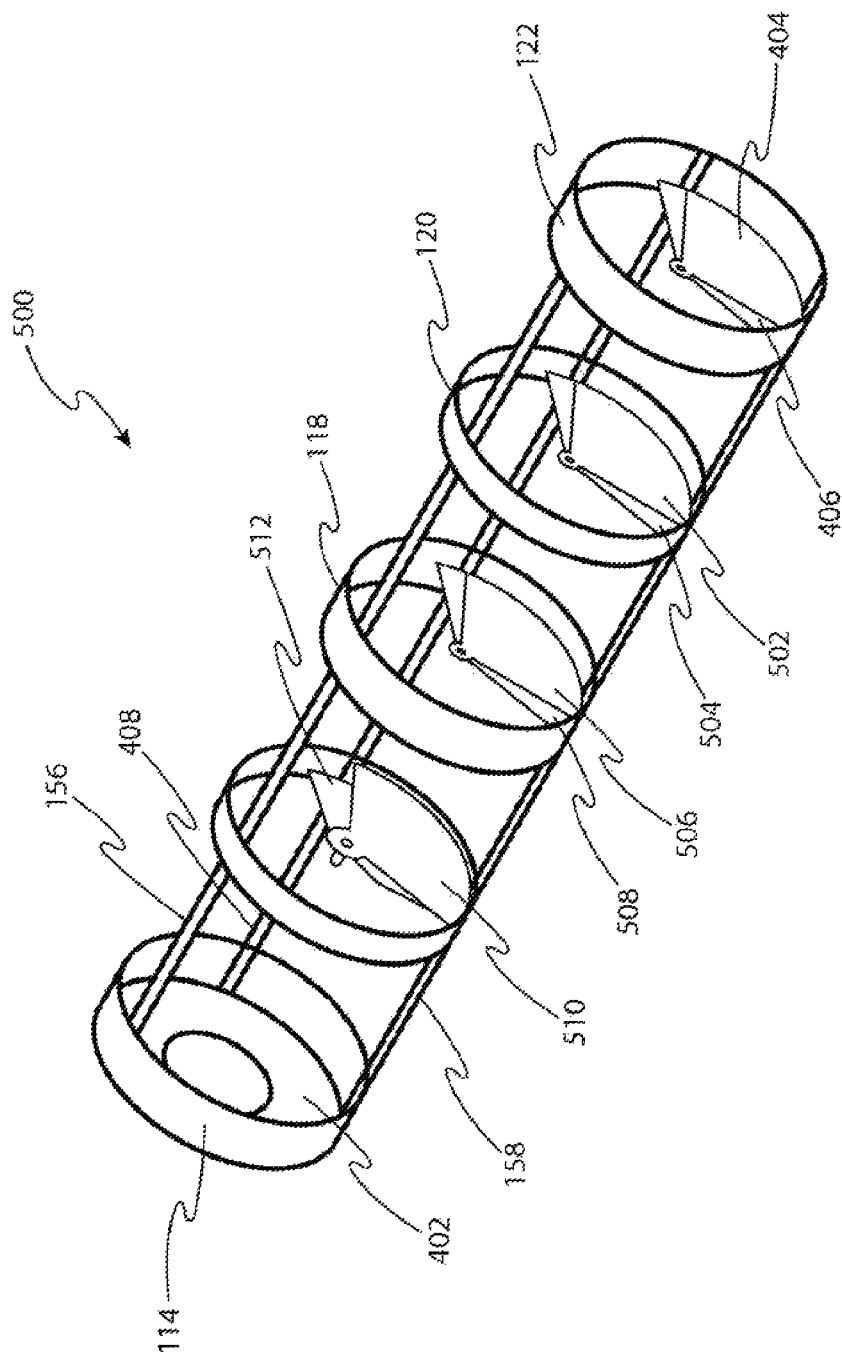
FIG. 5 is a perspective view of a barrel (or trommel) assembly of the machine shown in FIG. 1, according to preferred embodiments.

FIG. 4 is an end view 400 of the machine 100 as oriented and shown in FIG. 3, as viewed from its output or far end 104, according to preferred embodiments. The ends of the longitudinal hoop connecting members 156, 158, and 408 preferably interconnect each of the barrel hoops 114, 116, 118, 120, and 122. The trommel barrel assembly is preferably rotatably supported by drive wheels 134,136 on one side, and by correspondingly opposite support or bearing wheels 410 on the other side. Additional pairs of drive and correspondingly opposite support wheels may be used. For example, a third drive wheel may be included along the drive axle 132 that is positioned to engage with the middle barrel hoop 118, and a third corresponding support wheel may be included on the opposite side of the barrel assembly for support engagement with the middle barrel hoop 118.

Also visible in the end view 400 is an end plate 402 associated with the near end 102 barrel hoop 114 assembly, and a spinning divider 404 and a divider section 406 comprising baffle or damper components associated with the far end 104 barrel hoop 122 assembly. As will be described in further detail with respect to FIG. 5 below, the end plate 402 encloses the near end 102 of the trommel barrel assembly, except for the circular opening through which material may be moved by the lower auger 206 from the hopper into the first section 114, 106, 116 of the trommel barrel assembly. For simplicity of illustration of the end view 400, the baffle/damper components associated with intervening barrel hoops 116, 118, and 120 are aligned with one another so as to be hidden by the spinning divider 404 and the divider section 406 components associated with the far end 104 barrel hoop 122.

FIG. 5 is a perspective view 500 of a barrel (or trommel) assembly of the machine shown in FIG. 1, according to preferred embodiments. The trommel barrel assembly of machine 100 preferably comprises a cylinder having a near end 102 and a far end 104 with an interior space running longitudinally therebetween, the cylinder rotatable about a longitudinal axis 304, capable of being covered by a mesh screen material (such as nylon mesh netting), and having an input opening in its near end 102 for receiving input material 160 and an output opening in its far end 104 for discharging output material 162. The near end 102 and far end 104 preferably comprise respective hoops 114, 122 defining a diameter 212-214 of the trommel barrel assembly. According to some embodiments, a trommel barrel assembly comprises a near end 102 with end plate 402 and a far end 104 with a baffle 404, 406, along with a mesh screen cover, without the intervening hoops 116, 118, 120 and associated respective baffles depicted in FIG. 5. In more preferred embodiments, a trommel barrel assembly further comprises one or more intervening hoops 116, 118, 120 between the two end hoops 114, 122, along with baffles associated with each intervening hoop. A greater or smaller number of hoops (and associated baffles) may comprise a trommel barrel assembly, according to various embodiments.

Preferably, a trommel barrel assembly comprises the barrel (or trommel or trommel barrel) assembly 500 as depicted in FIG. 5, having five hoops 114, 116, 118, 120, 122 interconnected by three substantially equally radially spaced connecting members 156, 158, 408 running longitudinally between a near end 102 and far end 104 of the barrel assembly. Each of the hoops 116, 118, 120, and 122 preferably comprise associated baffle or damper components. As shown, barrel hoop 116 comprises baffle 510, 512, barrel hoop 118 comprises baffle 506, 508, barrel hoop 120 comprises baffle 502, 504, and barrel hoop 122 comprises baffle 404, 406. Also as shown in FIG. 5, the baffle components associated with each of the hoops 118, 120, and 122 are of similar construction, with the baffle components associated with hoop 116 constructed somewhat differently due to those baffle components providing bearing support for a lower auger axle 124, as illustrated in the side views in FIGS. 1 and 3. In some embodiments, each of the baffles are substantially similar in construction and function. In yet other embodiments, baffles of different construction are used, with such baffles having structure adapted and oriented so as to adjustably control the flow of material passing through the trommel barrel assembly toward and ultimately out of its output end 104.

In each of the baffles, as illustrated in FIG. 5, one of the baffle components is preferably fixed within its respective hoop interior portion, with a second baffle component capable of adjustment in relation to the first to change the cross-sectional area through which material may pass from one section of the trommel barrel to the next. For example, baffle dividers 510, 506, 502, and 404 may be attached to longitudinal connecting members 158 and 408 to effectively block longitudinal movement of material that runs up against a divider. The second baffle components 512, 508, 504, and 406 may be adjustably fastened, such as fastened by a lock nut along the longitudinal center axis 304, so that the second component in each hoop portion may be moved to change the cross-sectional area through which material may pass from one side of the baffle to the other. Preferably, each of the baffle dividers block about one third of the cross-sectional area circumscribed by its respective hoop, and each of the second baffle components (or adjustable or spinning component) may be oriented to increase the blocked cross-sectional area by another approximately one third, thereby allowing adjustment of each baffle to change the size of the opening between sections of the trommel barrel from approximately two thirds of the full area circumscribed by a hoop, down to approximately one third of the cross-sectional area circumscribed by a hoop.

The orientation of baffle components associate with one hoop in relation to another may be different than illustrated in FIG. 5. For example, each of the dividers 510, 506, 502, and 404 may be fastened to a different pair of longitudinal connecting members 156, 158, 408. That is, divider 510 may be fastened to connecting members 408 and 156 instead of, as depicted, connecting members 158 and 408; and divider 506 may be fastened to members 156 and 158 instead of members 158 and 408 as shown. In some embodiments, the baffle dividers may be fastened to the interior surfaces of their associated hoops instead of fastening to one or more connecting member 156, 158, 408. Likewise, in some embodiments, the second (or adjustable) baffle component may be adjustably fastened to the divider baffle component using removable fasteners between the two in addition to or instead of a locking nut along the longitudinal center axis 304.

FIG. 6 is a perspective view 600 of a hoop 116 portion of the barrel assembly shown in FIG. 5, along with an associated bearing section (or bearing divider) 510 and bearing spinner (together comprising a baffle) 512, according to preferred embodiments. As shown, an auger axle bearing 604 provides support for the lower auger axle 124, and the divider 510 and (adjustable) spinner 512 are shown providing a baffle opening 602. The spinner 512 may be adjusted in relation to the divider 510 to change the cross-sectional area of the baffle opening 602. As shown in FIG. 6, divider 510 and spinner 512 are substantially aligned with one another, providing a larger cross-sectional baffle opening 602. Preferably, the baffle opening 602 may be changed by rotating the spinner 512 in relation to divider 510 and locking the two baffle components together.

FIG. 7 is a perspective view 700 of a hoop 122 portion of the barrel assembly shown in FIG. 5, along with an associated divider section 406 and spinning divider 404 (together comprising a baffle), according to preferred embodiments. It is to be understood that either baffle component may be designating as the divider and the other as the spinner. The perspective view 700 shows a baffle associated with a hoop such that the baffle components are adjusted with relation to each other so as to reduce the cross-sectional opening 702 through which material is able to pass. The two baffle components may be fastened to one another by a fastener 704 along the longitudinal center axis 304 of the trommel barrel, for example.

In other embodiments, the baffle components associated with a particular hoop may comprise more than the two baffle components shown in FIGS. 5-7. For example, instead of divider 406 comprising a wedge (or pie shaped member or sector) blocking approximately 120 degrees or one third of the circular cross-section of hoop 122, two smaller dividers might be used, each comprising a wedge (or pie shape or sector) blocking perhaps 90 degrees or one fourth of the circular cross-section and each fastened to a longitudinal connecting member 156, 158, 408; and instead of spinner 404 comprising another wedge of approximately 120 degrees, the spinner 404 might comprise two spinners, each comprising wedge capable of adjustably fastening within the hoop so as to change the cross-sectional area through which material is able to flow from one side of the baffle to the other.

Preferably, as shown, a baffle comprises one or more pie shaped (or sector) planar members 406, 404 (constructed out of, for example, sheet metal or plastic or other material) oriented normal (perpendicular) to the trommel barrel longitudinal axis 304 and extending from an interior surface of a barrel hoop (such as hoop 122). A baffle preferably partially blocks material from longitudinal movement along the trommel barrel assembly, and most preferably (as shown in FIG. 7) blocks movement of material longitudinally from one side of the baffle member (eg. Baffle member 406) to its other side along the inside surface of its associated barrel hoop (eg. Hoop 122) and allows passage of material longitudinally across the hoop inside surface through a cross-sectional opening area 702 left unblocked.

As shown in FIGS. 5-7, the baffle components preferably comprise an arclength proximate to the inside surface of the associated hoop, whereby material flowable longitudinally through the trommel barrel assembly is blocked along the arclength of the (pie shaped or sector shaped) baffle member. The arclength of a 120 degree sector (pie shaped) baffle component, for example, comprises one third of the circumference defined by the (circular) associated hoop inside surface. In some embodiments, different shapes may be used other than the pie shaped or wedge (sector) baffle components described in FIGS. 5-7. For example, in one embodiment, baffle member 406, 404 may comprise a sector (such as the substantially 120 degree sector 406 shown in FIG. 7) except with a circular area centered about the longitudinal axis 304 omitted so that the resulting baffle member comprises a substantially planar member still having the same arclength along the inside surface of hoop 122 for blocking longitudinal movement of material across the inside surface of the hoop 122 from one side of the arclength to the other.

FIG. 8 is a side or top view 800 of an input hopper upper auger 204, according to preferred embodiments. The auger 204, as shown, has a near end 812, a far end 810, and a spiral (or helix) for driving material toward the far end 810 when rotated with axle 126. An auger diameter 802-806 and peak-to-peak helix dimension 802-804 (or 806-808) are shown. As the auger 204 rotates, material coming in contact with the auger's leading helix 814 is moved along the auger shaft toward the end helix 816. In preferred embodiments, auger 206 loosens material fed through input 160 and into the hopper 128, to provide improved distribution of material falling downward into the bottom of the hopper and lower auger housing 130.

FIG. 9 is a side or top view 900 of an input hopper lower auger 206, according to preferred embodiments. The auger 206, as shown, has a near end 912, a far end 910, and a spiral (or helix) for driving material toward the far end 910 when rotated with axle 124. An auger diameter 902-906 and peak-to-peak helix dimension 902-904 (or 906-908) are shown. As the auger 206 rotates, material coming in contact with the auger's helix is moved along the auger shaft toward the end helix 916 and through the opening in the near end 102 of the trommel barrel assembly. Preferably, the lower auger 206 is supported by a near end of the lower auger housing 130 and the bearing 604 associated with the second hoop 116 and its baffle 510, 512.

In preferred embodiments, the first section 114, 106, 116 includes a portion of the lower auger axle 124 running through the barrel section along the longitudinal center axis 304, to provide improved distribution of the effective weigh of the axle 124 bearing down on the trommel barrel assembly and its drive and support wheels. Further, extending axle 124 through the first section of the barrel assembly provides for a center axle on and over which input material entering the section and tumbling within the section may contact, improving distribution and flow characteristics of the material once inside the barrel section 114, 106, 116 during operation. In other embodiments, axle 124 may not extend beyond a bearing (not shown) at the near end 102 of the barrel assembly, or axle 124 may extend beyond hoop 116 to a bearing associated with hoop 118 or 120, or 122.

FIG. 10 is a perspective view of the barrel assembly shown in FIG. 5 illustrated with cross-hatching to depict portions of the barrel assembly covered or enveloped with a mesh nylon netting material, according to preferred embodiments. As shown, the barrel assembly 1000 is preferably covered with mesh nyon material from the outside surface of the first hoop 114 to the outside surface of the last hoop 122, covering over the intervening hoop outside surfaces. The end view of the barrel assembly 1000 is the same as in FIG. 4, with no mesh material visible in that view. The mesh screen material preferably covers the open sections 106, 108, 110, 112 and leaves the input and output ends of the trommel barrel 1000 free from mesh screen material. Preferably, enough of the outside surfaces of hoops 114 and 122 are left uncovered where the drive and support wheels 134, 136, 410 engage those hoop surfaces. In preferred embodiments, all sections 106, 108, 110, 112 are covered by mesh netting having the same opening sizes. In other embodiments, different sections may use different sized mesh netting.

In preferred embodiments, each section of the trommel barrel "sorts" plant material of different sizes, with smaller components sorted out from a section of the trommel barrel by falling through the mesh in that section, with the next section of the trommel barrel having larger sized mesh openings. In some embodiments, each longitudinally successive section of the trommel barrel may have progressively larger openings than the preceding section. The machine 100 with trommel barrel having different sized mesh openings in different sections may operate as a sorting (or sorter) machine or sorter. The trommel barrel may comprise a number of different longitudinally separate sections. The trommel barrel may comprise, for example, two, three, four, five, or six sections (or chambers). Each section may use different mesh size so that different sized material is sorted out from the material passing longitudinally through the interior of the trommel barrel.

Or various sections may use the same or different sized mesh opening from one section to the next. For example, the machine 100 may comprise four sections with mesh netting of the same size, plus a fifth section at the output end of the trommel barrel having a different sized mesh netting that allows sorting out trimmed plant material of a certain size, with trimmed plant material of a larger size remaining inside the trommel barrel. A sixth section may follow the fifth, with mesh netting with larger openings than the netting used in the fifth section, thereby sorting out material of another (larger) size. Or the trommel barrel may comprise six sections all covered with the same sized mesh netting, with the lengthened trommel providing additional trimming of the material passing through it. The trommel barrel may be longitudinally longer or shorter, or have a greater number or fewer number of sections than shown in the figures herein, and the mesh covering used for each section may be the same or different from one section to the next.

The inventor discovered that the combination of weight, volume, flower size, and length of time tumbling within the mesh barrel 1000 all contribute to how well the plant material is trimmed and separated. The inventor found that some varieties of plants may have flowers with leafy matter that can be mechanically separated/trimmed using machine 100 so as to isolate the leafy matter from the flower. Additionally, some varieties of plants may have other components that can be further separated and collected. For example, seeds may need to be separated/isolated.

The inventor determined that different mesh sizes may be used. Different mesh sizes may be used from one section of the trommel barrel 1000 to the next, or mesh screen material may be changed to trim and separate different plant material introduced into and tumbled within the trommel barrel 1000. Mesh size is measured by how many threads of mesh there are crossing per square inch. For example, a 110-mesh screen has 110 cross-threads per inch. The higher the mesh count, the finer the holes will be in the screen/mesh.

The inventor discovered that utilizing a large trommel screen alone (without the baffles shown in FIG. 10, for example) performed poorly; and the inventor found that the material would immediately spread out through the length of the (cylindrical) trommel screen and would not have a necessary weight needed to effectively tumble (or achieve a desired tumbling movement within the barrel) at a rotation rate and time of approximately 35 RPM for 1 to five minutes.

The inventor determined that some of the main governing equations for a trommel screen include the screening rate, screening efficiency, and residence time of particles in the screen. The inventor determined the main factors affecting the screening efficiency and production rate include the rotational velocity of the drum/trommel screen, mass flow rate of feed particles, size of the drum, inclination of trommel screen, and screen mesh opening size. The inventor discovered a balance between the screening (trimming and separating) efficiency and production rate.

The inventor discovered and invented various baffle/damper mechanisms, described above, to sectionalize and control the rate at which plant material can flow from one section/barrel to the next within the trommel barrel assembly 1000. The inventor discovered that the sectionalizing and control of flow rate is critical because the plant material needs to have a sufficient weight and time for friction to trim the leafy material from flowers/buds of plant material as the substantially horizontal trommel screen rotates. The inventor discovered that, especially with dried plant material, trimming and separating without the baffles between sections of the barrel assembly delivers poor trimming and separating effectiveness.

The inventor discovered that utilizing adjustable baffles slows down the plant material in each separate chamber/section of the trommel barrel assembly 1000 as well as controls the rate at which the trimmed plant material exits the far end 104.

The inventor determined that the mesh material that makes up the screen may comprise a variety of sizes and materials depending on desired outcome such as aggressiveness or gentleness of trimming. In various embodiments, the mesh may comprise materials such as metal, plastic, various fabric, polyester, nylon, etc. Preferably, the mesh in the trommel barrel assembly 1000 comprises flexible nylon mesh netting. Preferably, the mesh size ranges from 80 microns to ¾ of an inch (that is, the mesh opening sizes range from 80 microns to ¾ inch), which the inventor determined provides for differing levels of desired trimming and separation. The mesh screen used for trommel barrel assembly 1000 is preferably readily and easily interchangeable, such as, for example, by hook-and-loop type fasteners on hoops 114 and 122. In one embodiment, the mesh screen used with trommel barrel assembly 1000 comprises a nylon netting with openings of approximately 0.25 to 0.5 inch in width.

In preferred embodiments, a motor (such as motor 172) causes the load to tumble over and over a substantially horizontal longitudinal axis of rotation 304 for several minutes at up to approximately 45 RPM. In other embodiments, a hand crank may be substituted for the motor, causing the load to tumble over and over for several minutes at up to approximately 45 RPM.

Exemplary dimensions associated with machine 100, according to preferred embodiments, include the following:

Trommel barrel assembly longitudinal length (102-104) from near end 102 to far end 104=113 inches. Machine 100 frame side-to-side width 208-210=40 inches. Height (144-138) at a far end 104 of the bottom trough surface 142 from a horizontal floor surface (x-axis) 150 (depicted in FIG. 1)=17 inches. Height (146-148) at a near end 102 of the bottom trough surface 142 from a horizontal floor surface (x-axis) 150=26.25 inches. Angle of inclination (depicted in FIG. 1) between a trommel barrel assembly longitudinal axis 304 and a horizontal floor surface (x-axis) 150=five (5) degrees. Height (144-306) at far end 104 of the bottom trough surface 142 from a horizontal floor surface (x-axis) 150=26.25 inches.

Barrel hoop diameter 212-214 of hoops 114, 116, 118, 120, and 122=26 inches. Radius 304-212 of hoops 114, 116, 118, 120, and 122=13 inches. Circumference of hoops 114, 116, 118, 120, and 122=81.68 inches. Arclength of a 120 degree sector (wedge or pie shape) baffle component (eg. baffle divider or spinner 404, 406)=27.23 inches. Arclength of a 90 degree sector (or quandrant) (wedge or pie shape) baffle component=20.42 inches. Cross-sectional area of hoops 114, 116, 118, 120, and 122=531 square inches. Cross-sectional area of opening 702 depicted in FIG. 7=roughly 177 square inches. Cross-sectional area of opening 602 depicted in FIG. 6=roughly 354 square inches. Diameter of a circular opening in the end plate 402, the opening centered about a trommel barrel assembly longitudinal axis 304=11 inches.

Upper auger axle (or shaft) 126 diameter=1 inch. Upper auger diameter 802-806=7 inches. Upper auger peak-to-peak spacing 802-804 and 806-808=7 inches. Upper auger length 812-810=32.94 inches. Lower auger axle (or shaft) 124 diameter=1 inch. Lower auger diameter 902-906=9 inches. Lower auger peak-to-peak spacing 902-804 and 906-908=9 inches. Lower auger length 912-910=68.13 inches.

In preferred embodiments, dimensions associated with machine 100 are as depicted in the figures described herein. The inventor discovered and determined that the dimensions and proportional relationship identified and illustrated in the figures described herein provide effective trimming and separation of plant materials and improvements over previously available equipment designs and methods. In some embodiments, different dimensions for various components comprising machine 100 may be used. In some embodiments, barrel hoop diameter 212-214 of hoops 114, 116, 118, 120, and 122 may be within a range of approximately 20 to 30 inches. In some embodiments, trommel barrel assembly longitudinal length 102-104 may be within a range of 80 to 130 inches. An angle of inclination of longitudinal axis 304 is preferably between zero and ten degrees.

FIG. 11 is a perspective view of a trommel barrel portion 1100 of a continuous feed multi-purpose plant/flower trimmer and separator machine, according to preferred embodiments. The trommel barrel portion 1100 (or trommel 1100) preferably comprises a scissor lift mechanism 1180 for adjusting the angle of inclination of the trommel barrel, preferably to slightly lower the far end 1104 of the trommel barrel as compared with its near end 1102. Wheels 1152, 1180 are preferably included on each of the frame supporting legs to provide portability. An top cover 1182 is shown covering the trommel from its near (input) end 1102 to its far (output) end 1104. In preferred embodiments, an output housing 1188 and output chute 1190 capture material discharged from the output far end 1104 of the trommel, with the output flow 1186 directed from the output chute 1190. As shown in FIG. 11, an auger 1192 is oriented in the bottom of the lower trough below the trommel barrel, the auger 1192 adapted to move trim material longitudinally along (the inside surface of) a lower trough bottom 1142 toward the far end/output end of the trommel. A trim output chute is preferably positioned at the output end of the lower trough, as shown above the scissor lift mechanism 1180. The trim auger may be similar in proportion and design as the augers shown in FIGS. 8 and 9, and having a shaft comprising a trim removal drive axle 1194 preferably driven by a trim removal auger motor 1196, and preferably mounted as shown, at the near end of the trim removal auger 1192 opposite the output end of the trommel barrel. In some embodiments, the trim removal drive axle 1194 may instead be driven via mechanical drive linkage with other motors such as a trommel drive motor 1172.

Components of the trommel barrel portion 1100 are, in preferred embodiments, substantially similar or the same in terms of function, representative proportion and dimensions, and orientation to those shown and described with respect to machine 100. For example, as shown in FIG. 11, drive axle 1158 and drive motor 1172 are preferably as described with respect to drive axle 158 and drive motor 172. Likewise, the trommel barrel assembly extends from a near (input) end 1102 (with end cap 1402) to a far (output) end 1104, with a first hoop 1114, second hoop 116, third hoop 1118, fourth hoop 1120, and fifth hoop 1122 preferably as described with respect to machine 100 near end 102, end cap 402, far end 104, and hoops 114, 116, 118, 120, 122, respectively.

The baffles shown in FIG. 11 corresponding to each of the hoops 1116, 1118, 1120, and 1122 preferably function as the baffles previously described for machine 100 and trommel barrel assembly 1000 (when the trommel barrel is covered with mesh netting), with the baffle components shown in FIG. 11 having a bow-tie shape instead of pie shaped sections. For example, as shown, the baffles comprise bow-tie shaped components 1404, 1406 which preferably operate comparably and substantially similar as described previously with respect to baffle components 404, 406. The two bow-tie shaped baffle components 1404, 1406 rotatably adjust with respect to one another to vary the size of cross-sectional opening between one section of the trommel barrel to the next. One component or the other, baffle component 1404 or 1406, is preferably fixed to one of the longitudinal connecting members that hold each of the hoops 1114, 1116, 1118, 1120, 1122 in relation to one another, and the other baffle component 1404 or 1406 is adjustable in relation to the other so as to allow for controllably adjusting the opening between sections of the trommel barrel. In one embodiment, for example, baffle component 1404 may comprise a bow-tie shaped substantially planar member oriented normal to the longitudinal axis of the trommel barrel, with each end of the bow-tie shaped member a mirror image of the other and comprising a sector sized to block material passage within the trommel barrel of approximately 60 degrees, so opposite sectors together blocking 120 degrees or one third of the cross-sectional area from one side of the baffle component to the other; and if baffle component 1406 comprises a similar construction as the other, the two baffle components together block from one third of the cross-sectional area when the two are completely overlapping one another, to two thirds of the cross-sectional area when the two baffle components are oriented to block as much of the cross-sectional area as possible. In preferred embodiments, the two baffle components 1404, 1406 rotatably adjust with respect to one another so as to block a portion of the cross-sectional area from one section of the trommel (on one side of a baffle and associated hoop) to the next, leaving two areas of blockage and two areas of opening (due to the bow-tie shaped areas of blockage and corresponding opening).

FIG. 12 is a perspective view of an input hopper and auger portion 1200 of a continuous feed multi-purpose plant/flower trimmer and separator machine, according to preferred embodiments. The input hopper and auger 1200 preferably comprises a hopper 1202 supported by legs 1204 having wheels 1218 allowing movement with, for example, a trommel barrel portion 1100. As shown, an auger 1206 is oriented within an auger housing 1210 and the lower portion of the hopper 1202, a motor 1208 may be used to move material fed into the hopper (hopper input flow 1212) from the lower portion of the hopper 1202, through the auger housing 1210, and through an auger input feed tube 1216. The auger input feed tube 1216 is preferably sized and configured to fit into an input or near end of a trommel barrel, for example the opening in the end cap 1402 of the trommel barrel assembly 1100 shown in FIG. 11. An auger housing top cover 1220 may be used to contain hopper input material 1212 as the material is moved by the auger 1206 through the auger feed tube 1216 and outward as trommel input material 1214. In various preferred embodiments, the auger 1206 may comprise an auger having characteristics similar to the aforementioned augers described and illustrated in FIGS. 8 and 9. In preferred embodiments, the input hopper and auger 1200 is configured so that hoper input material 1212 may be fed into the hopper 1202 at a height below the trommel input flow 1214, with the auger 1206 thereby moving input material 1212 upward and into the open end of a trommel barrel assembly receiving trommel input material 1214 from the auger input feed tube 1216.

FIG. 13 is a conceptual partially exploded side view 1300 of a barrel (or trommel) assembly incorporating a carbon dioxide ($CO_2$) infusion system, according to preferred embodiments. The trommel barrel preferably comprises a circular near end 1304 and a circular far end 1314, with longitudinal connecting members (not shown) interconnecting the near and far ends as well as circular members 1308, 1310, and 1312 therebetween, defining a first section 1316, a second section 1318, a third section 1320, and a fourth section 1322 of the trommel barrel. The near end 1304 preferably comprises a hoop and end cap such as the hoop 1114 with end cap 1402 shown in FIG. 11; the far end 1314 preferably comprises a hoop and baffle components such as the hoop 1122 with its baffle components shown in FIG. 11; and the intermediary circular members 1308, 1310, 1312 comprise respective hoops 1116, 1118, and 1120 and their respective baffle components 1404, 1406 shown in FIG. 11. An auger feed 1302 is shown in FIG. 13 protruding through an opening in the near end 1304. The auger feed 1302 preferably comprises the auger input feed tube 1216 shown in FIG. 11.

The carbon dioxide infusion system preferably comprises components oriented along the longitudinal axis of rotation (such as axis 304) of the trommel barrel. The components preferably comprise flexible perforated hose extending between sections of the trommel barrel longitudinal axis, from the axial center of the first baffle 1308, to the second baffle 1310, to the third baffle 1312, and finally to the fourth baffle 1314. Liquid carbon dioxide is preferably introduced into the perforated hose at the far end 1314, which then flows longitudinally toward the first baffle 1308, dispersing liquid CO2 through the hose perforations.

As shown in FIG. 13, a CO2 tank 1370 is fluidly connected to a rotary valve 1366 via a hose 1368. The rotary valve 1366 is preferably connected to threads 1348 on one end of a double male hollow rod. The double male rod extends through a nut 1330 locking the baffle components 1314 in place, with threads 1344 on the opposite end of the rod. A flexible hose 1372 extending substantially the length of the trommel section 1322 from the fourth baffle 1314 to the third baffle 1312 comprises female swivel fittings 1360, 1358 on each end. The swivel fitting 1358 is fastenable to threads 1342 of the double male rod extending through the nut 1328 locking baffle 1312 in place. In similar fashion, flexible hose 1364 extending axially along the length of the section 1320 between the third baffle 1312 and the second baffle 1310 has swivel fittings 1356 and 1354 fastenable to threads 1340 and 1338, respectively, on the double male rod extending through baffle locking nut 1326. Likewise, flexible hose 1362 extends from a swivel fitting 1352 fastenable to threads 1336 associated with baffle locking nut 1326 and a swivel fitting 1350 fastenable to threads 1334 associated with baffle locking nut 1324. An end cap 1306 is shown fastened to the threads 1332 of the double male rod extending through baffle locking nut 1324.

Preferably, when the longitudinal axial components shown in FIG. 13 are fastened together (not shown), liquid CO2 is able to flow from the CO2 tank 1370 through the perforated flexible hoses (or rotating perforated shafts) 1372, 1364, and 1362 extending along the longitudinal axis 304 of the trommel barrel across each of the second 1318, third 1320, and fourth 1322 sections of the trommel barrel. The hoses 1372, 1364, 1362 preferably rotate along with rotation of the trommel barrel. However, in some embodiments, the hoses 1372, 1364, 1362 may be static and instead of rotating about the rotary valve 1366 as the trommel barrel rotates. The first section 1316 of the trommel barrel, the inventor discovered, is preferably left open to allow for input material to be received into the trommel barrel from the auger feed 1302. The inventor determined that the perforated rotating shaft or hoses enable even distribution of liquid carbon dioxide throughout the section (or chamber) of the trommel barrel so that the liquid CO2 hits all the plant material as it tumbles over and around the axial hose or shaft. The liquid CO2 flash freezes the plant materials, which the inventor determined expedites and enhances the effectiveness of trimming and separating of plant material within the mesh netting covered trommel barrel. The inventor discovered infusing liquid carbon dioxide using the CO2 infusion system 1300 helps make the material being processed more brittle and easier to trim. The inventor discovered that the CO2 infusion system 1300 allows plant material to be effectively trimmed and separated that is wet, that is slightly wet, or that has more moisture content than would be typically desired for optimal trimming.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A continuous feed machine for trimming and separating plant material comprising:

a cylindrically shaped trommel barrel that extends longitudinally between a circular first end and a circular second end, with the first and second ends interconnected by one or more longitudinal connecting members, and the cylindrically shaped trommel barrel having a trommel barrel interior space running longitudinally between the first and second ends;

a trommel barrel input opening in said first end sized and oriented to receive plant material to be trimmed and separated into said trommel barrel interior space;

a trommel barrel output opening in said second end sized and oriented to allow passage of plant material output from said trommel barrel interior space, the trommel barrel output opening configured to be adjustable to permit controlling a cross-sectional opening of the trommel barrel output opening, thereby permitting control of a material flow rate of material passing through the trommel barrel output opening;

a longitudinal axis of rotation of said trommel barrel that extends within said trommel barrel interior space from said first end to said second end, and about which said trommel barrel is configured to rotate at a predetermined rate;

a screening material comprising a mesh or screen or perforated material, the screening material enclosing said trommel barrel interior space between said first end and said second end, the screening material having openings configured to trim and separate components of plant material when said trommel barrel is rotated at said predetermined rate, said rotation causing tumbling of said plant material within said trommel barrel interior space and permitting movement of said plant material longitudinally between said first end and said second end;

one or more baffles positioned within said trommel barrel interior space between said first and said second ends, each of said baffles separating said trommel barrel interior space into longitudinally separate sections, and at least one of said baffles configured as an adjustable baffle to permit controlling a cross-sectional opening between a first section of said trommel barrel interior space that is adjacent to a first side of the baffle and a second section of said trommel barrel interior space that is adjacent to a second side of the baffle, thereby permitting control of a material flow rate between the first and second sections of said trommel barrel interior space;

a trommel barrel output housing that protrudes along the longitudinal axis away from the circular second end and extends transverse to the longitudinal axis from a top of the trommel barrel to below a bottom of the trommel barrel and that surrounds and encloses the circular second end of the trommel barrel and the trommel barrel output opening so as to capture material from the trommel barrel output opening, which, due to rotation of the trommel barrel at the predetermined rate, is discharged into the trommel barrel output housing; and a trommel barrel output chute positioned at a bottom of the trommel barrel output housing at a level below the bottom of the trommel barrel and having a discharge opening oriented transverse to the longitudinal axis and angled downward away from the bottom of the trommel barrel housing, the trommel barrel chute configured to direct material discharged from the trommel barrel output opening through the trommel barrel output chute discharge opening in a direction transverse to the longitudinal axis and angled downward away from the bottom of the trommel barrel housing, wherein the continuous feed machine is a bladeless trimming and separating machine that is free from a cutting reel and a blade bar for trimming or separating plant material, and wherein the continuous feed machine utilizes, in combination, the trommel barrel enclosed by the screening material and rotated at the predetermined rate, the trommel barrel input opening, the one or more baffles, and the trommel barrel output housing with the output chute, to trim and separate the plant material.

2. The machine of claim 1, further comprising a plurality of support wheels under said first end and said second end, each wheel rotatably supporting said trommel barrel, and at least one of said wheels comprising a drive wheel for causing rotation of said trommel barrel about said longitudinal axis of rotation.

3. The machine of claim 2, further comprising an adjustable frame structure supporting said plurality of support wheels, said adjustable frame capable of permitting changing an inclination of said trommel barrel so that said trommel barrel second end is oriented to be lower than said trommel barrel first end.

4. The machine of claim 2, further comprising a motor connected to said drive wheel, said motor adapted to cause rotation of said trommel barrel at said predetermined rate.

5. The machine of claim 2, further comprising a hand crank connected to said drive wheel, said hand crank adapted to permit manual operation to rotate said trommel barrel at said predetermined rate.

6. The machine of claim 1, further comprising an auger sized and oriented to feed plant material into said trommel barrel input opening.

7. The machine of claim 1, further comprising a hopper sized and adapted to receive plant material to be fed into said trommel barrel input opening, the hopper coupled with the trommel barrel input opening and positioned upstream of the trommel barrel and along the longitudinal axis of the trommel barrel.

8. The machine of claim 1, wherein the trommel barrel input opening is a circular unrestricted and baffle-free opening centered about the longitudinal axis of rotation of the trommel barrel and has an input opening diameter that is less than a diameter of the trommel barrel interior space.

9. The machine of claim 1, further comprising a trough sized and oriented under said trommel barrel for catching trim falling down through said screening material covering said trommel barrel.

10. The machine of claim 1, further comprising one or more augers sized and oriented under said trommel barrel for receiving and moving trim falling down through said screening material covering said trommel barrel.

11. The machine of claim 1, wherein the first and second sections comprise two longitudinally separate sections, with the first section of the trommel barrel interior space comprising a first longitudinal portion of the trommel barrel interior space between the first end and a first baffle, and the second section of the trommel barrel interior space comprising a second longitudinal portion of the trommel barrel interior space between the first baffle and a second baffle, wherein the second baffle is at the second end, wherein plant material is able to flow from the trommel barrel input opening in the first end, through a first baffle opening in the first baffle, and through a second baffle opening in the second baffle, wherein a trommel material flow rate is at least partially controllable by adjusting the first baffle opening and the second baffle opening, wherein adjusting the first baffle opening changes an amount of time material spends within the first section, and wherein adjusting the second baffle opening changes an amount of time material spends within the second section.

12. The machine of claim 1, wherein each of said baffles comprises a pair of substantially wedge shaped blocking members that may be adjusted with one another to increase or decrease the cross-sectional opening between longitudinal sides of said blocking members.

13. The machine of claim 12, wherein each of said pair of substantially wedge shaped blocking members comprises a substantially planar sector, oriented normal to said longitudinal axis of rotation, and having an arclength of approximately one third of the circumference of said trommel barrel, thereby permitting adjustment of the blocking members to change the cross-sectional opening from between one third to two thirds of the cross-sectional area of said trommel barrel.

14. The machine of claim 1, wherein said screening material is made of metal, plastic, fabric, polyester, or nylon, or wherein said screening material comprises flexible nylon netting.

15. A method for trimming and separating plant material comprising:

providing a machine as claimed in claim 1;

feeding plant material into said trommel barrel input opening, the plant material comprising flowers and/or buds having leafy matter to be trimmed and separated therefrom;

rotating said trommel barrel at said predetermined rate including controlling a material flow rate through each section of the trommel so as to cause the barrel to rotate with sufficient speed and with sufficient plant material within each section to trim and separate leafy matter from the flowers and/or buds by tumbling the flowers and/or buds within the trommel barrel in a continuous curling wave that gently rubs the flowers and/or buds together against each other;

receiving output plant material from said trommel barrel output opening via the output housing and trommel barrel output chute, the output plant material comprising trimmed flowers and/or buds, wherein the trimmed flowers and/or buds travels out of the trommel barrel output opening and then through the output housing before exiting the trommel barrel output chute discharge opening;

collecting trim material that falls down through said screening material covering said trommel barrel, the trim material comprising leafy matter trimmed and separated from the plant material fed into the trommel barrel input opening.

16. The method of claim 15, wherein the plant material comprises *cannabis*, the method further comprising adjusting said one or more baffles to increase or decrease a cross-sectional opening from one section of said trommel barrel to the next, thereby controlling said material flow rate between sections of said trommel barrel, and thereby controlling the quantity of material allowed to accumulate within a particular section of said trommel barrel.

17. The method of claim 15, further comprising adjusting a frame structure rotatably supporting said trommel barrel to change an inclination of said trommel barrel so that said trommel barrel second end is oriented to be lower than said trommel barrel first end.

18. The method of claim 15, further comprising changing said predetermined rate of rotation so as to control a rate of plant material received from said trommel barrel output opening.

19. The method of claim 15, wherein said feeding plant material into said trommel barrel input opening comprises one or more augers loading plant material into said trommel barrel input opening, and wherein said collecting trim material comprises one or more augers removing trim material that has fallen down through said covering material of said trommel barrel.

20. The method of claim 15, further comprising replacing said screening material covering said trommel barrel with a different screening material having different sized openings oriented to trim and separate components of different plant material to be trimmed and separated.

* * * * *